United States Patent
Jia et al.

(10) Patent No.: US 11,442,724 B2
(45) Date of Patent: Sep. 13, 2022

(54) PATTERN RECOGNITION

(71) Applicant: INTERNATIONAL BUSINESS MACHINES CORPORATION, Armonk, NY (US)

(72) Inventors: Zhi Peng Jia, Xi'an (CN); Xiang Yu Yang, Xi'an (CN); Zhi Cao, Xi'an (CN); De Shuo Kong, Beijing (CN); Jing Wu, Xi'an (CN); Rong Fu He, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/703,041

(22) Filed: Dec. 4, 2019

(65) Prior Publication Data
US 2021/0173638 A1    Jun. 10, 2021

(51) Int. Cl.
G06F 8/74 (2018.01)
G06F 8/20 (2018.01)
G06F 8/75 (2018.01)
G06F 8/33 (2018.01)
G06F 8/30 (2018.01)

(52) U.S. Cl.
CPC .............. *G06F 8/74* (2013.01); *G06F 8/24* (2013.01); *G06F 8/315* (2013.01); *G06F 8/33* (2013.01); *G06F 8/75* (2013.01)

(58) Field of Classification Search
CPC ... G06F 8/33; G06F 8/315; G06F 8/75; G06F 8/74; G06F 8/24
See application file for complete search history.

(56) References Cited

U.S. PATENT DOCUMENTS 5,386,508 A * 1/1995 Itonori ................ G05B 19/056
382/113
5,442,738 A * 8/1995 Chapman .............. G06F 8/33
345/639
(Continued)

OTHER PUBLICATIONS

Mell, "The NIST Definition of Cloud Computing", Recommendations of the National Institute of Standards and Technology, Computer Security Division, Sep. 2011, 7 pages.
(Continued)

*Primary Examiner* — Wei Y Zhen
*Assistant Examiner* — Amir Soltanzadeh
(74) *Attorney, Agent, or Firm* — Scott Dobson; Andrew D. Wright; Roberts Calderon Safran & Cole, P.C.

(57) ABSTRACT

Systems and methods of computer program code or business process design pattern recognition are provided. In embodiments, a method includes identifying, by the computing device, predefined elements and relationships between the elements in a digital industry product based on stored rules; generating, by the computing device, a diagram based on stored image rules, the diagram including graphical notations and text-based information representing the elements and the relationships between the elements; removing, by the computing device, the text-based information from the diagram to produce a modified diagram; and determining, by the computing device, that the modified diagram includes at least one predetermined pattern from a plurality of stored patterns using image object detection.

19 Claims, 12 Drawing Sheets

(56) References Cited

U.S. PATENT DOCUMENTS

| | | | | |
|---|---|---|---|---|
| 7,627,861 | B2 | 12/2009 | Smith et al. | |
| 2005/0166193 | A1* | 7/2005 | Smith | G06F 8/75 717/143 |
| 2007/0050358 | A1* | 3/2007 | Ganesh | G06F 8/36 |
| 2007/0234318 | A1* | 10/2007 | Seto | G06F 8/60 717/140 |
| 2012/0192143 | A1* | 7/2012 | Elaasar | G06F 8/74 717/104 |
| 2013/0318501 | A1* | 5/2013 | Ananth | G06F 8/10 717/125 |
| 2013/0346940 | A1* | 12/2013 | White | G06F 8/34 717/105 |
| 2014/0173563 | A1 | 6/2014 | Dias et al. | |

OTHER PUBLICATIONS

Alhusain, "Towards Machine Learning Based Design Pattern Recognition", http://www.cs.nott.ac.uk/~pszrij/mypapers/06651312.pdf, IEEE, Guildford, UK, Oct. 31, 2013, 8 pages.

Uchiyama, "Detecting Design Patterns in Object-Oriented Program Source Code by Using Metrics and Machine Learning", https://file.scirp.org/pdf/JSEA_2014111410570703.pdf, Journal of Software Engineering and Applications, Nov. 2014, 17 pages.

Anonymous, "Software design pattern", https://en.wikipedia.org/wiki/Software_design_pattern, Wikipedia, accessed Oct. 8, 2019, 4 pages.

* cited by examiner

PATTERN RECOGNITION

BACKGROUND

Aspects of the present invention relate generally to design pattern recognition and, more particularly, to computer program code or business process design pattern recognition.

A design pattern provides a general reusable solution for the common scenarios occurring in software design. These design patterns can be grouped into the following three main categories: 1) Creational, 2) Structural, and 3) Behavioral. There exist established names for patterns that can be used by programmers to communicate information about the pattern (e.g., the issue it addresses). Examples includes "factory method", "singleton", "mediator", and "prototype."

In software engineering, a class diagram in the Unified Modeling Language (UML) is a type of static structure diagram that describes the structure of a system by showing the system's classes, their attributes, operations (or methods), and the relationships among objects. A relationship is a general term covering the specific types of logical connections found on class and object diagrams. For example, instance-level relationships include: 1) dependency, 2) aggregation, and 3) composition. Established UML graphical notations may be utilized to express these relationships in the class diagram.

Automated inference engines have been developed to generate proofs indicative of patterns present in computer program source code. The proofs can then be converted to a source code pattern report (diagram) drawn in the UML format to depict the patterns (e.g., relationships).

SUMMARY

In a first aspect of the invention, there is a computer-implemented method including: identifying, by a computing device, predefined elements and relationships between the elements in a digital industry product based on stored rules; generating, by the computing device, a diagram based on stored image rules, the diagram including graphical notations and text-based information representing the elements and the relationships between the elements; removing, by the computing device, the text-based information from the diagram to produce a modified diagram; and determining, by the computing device, that the modified diagram includes at least one predetermined pattern from a plurality of stored patterns using image object detection.

In another aspect of the invention, there is a computer program product, the computer program product comprising one or more computer readable storage media having program instructions collectively stored on the one or more computer readable storage media, the program instructions executable to: obtain program code; identify classes and relationships between classes in the program code based on stored rules; generate a class diagram based on stored image rules, the class diagram including graphical notations and text-based information regarding the program code; remove the text-based information from the class diagram to produce a modified class diagram; determine that the modified class diagram includes at least one predetermined pattern from a plurality of stored patterns using image object detection; and generate a report including information regarding the at least one predetermined pattern.

In another aspect of the invention, there is system including a processor, a computer readable memory, and a computer readable storage medium. The system includes program instructions to obtain a digital industry product from a remote computing device; program instructions to identify elements and relationships between elements in the digital industry product based on stored rules; program instructions to generate a diagram based on stored image rules, the diagram including graphical notations and text-based information representing the elements and the relationships between the elements; program instructions to remove the text-based information from the diagram to produce a modified diagram; program instructions to determine that the modified diagram includes at least one predetermined pattern from a plurality of stored patterns using image object detection; and program instructions to generate a report including information regarding the at least one predetermined pattern. The program instructions are stored on the computer readable storage medium for execution by the processor via the computer readable memory.

BRIEF DESCRIPTION OF THE DRAWINGS

Embodiments of the present invention are described in the detailed description which follows, in reference to the noted plurality of drawings by way of non-limiting examples of exemplary embodiments of the present invention.

DETAILED DESCRIPTION

Figure 1:
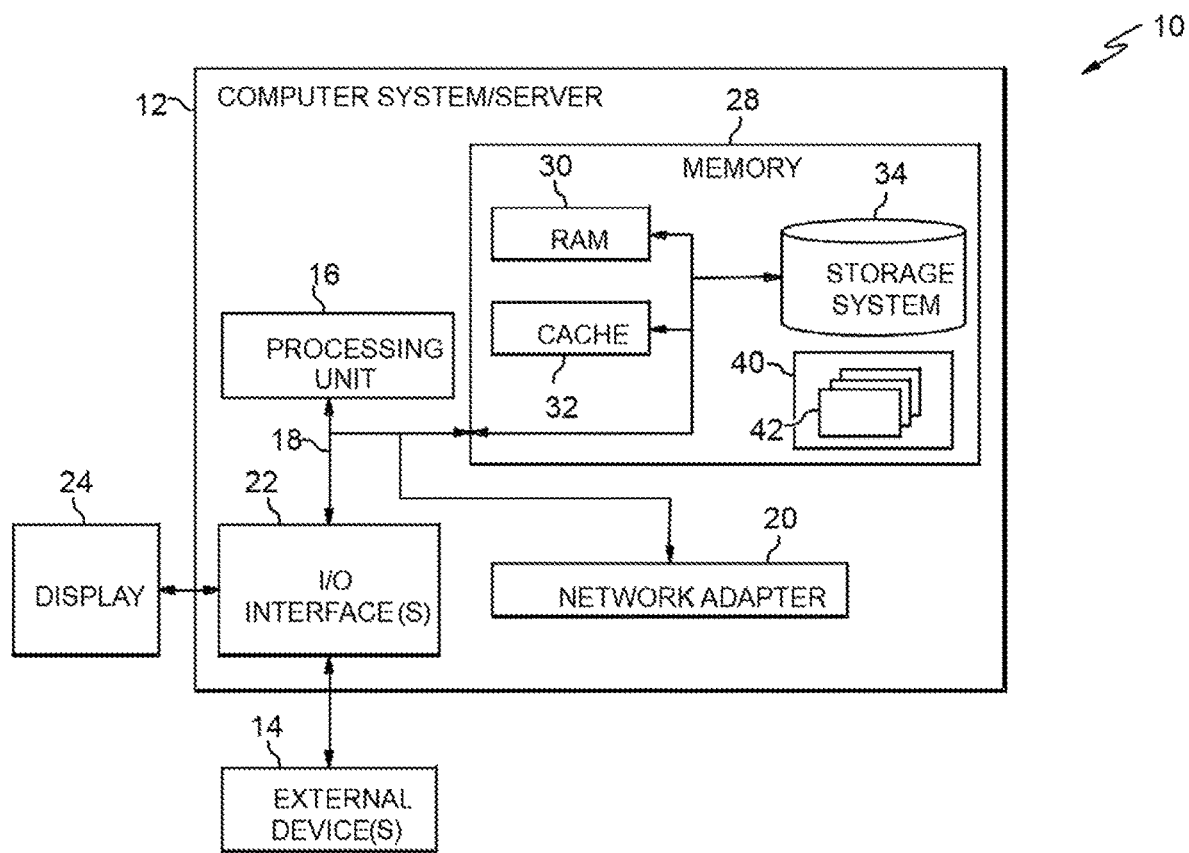
FIG. 1 depicts a cloud computing node according to an embodiment of the present invention.

Aspects of the present invention relate generally to design pattern recognition and, more particularly, to computer program code or business process design pattern recognition. In embodiments, a cognitive system and method is provided enabling the quick and accurate identification of predetermined design patterns in digital industry products (e.g., computer program code and/or business processes data). In aspects, according to defined rules, a series of standard template images are generated for each abstract pattern applied in a particular industry, and the following steps are implemented by a system to verify the existence of one or more of the abstract patterns in an industry product: 1) extract elements and relationships of the elements used in the industry product; 2) generate, according to defined rules, images which are different combinations of the elements and relationships; 3) execute object-recognition on the images based on pre-generated template images associated with abstract patterns; 4) and detecting one or more of the abstract patterns in the images, indicating that the abstract pattern exists in the industry product.

Embodiments of the invention provide a new cognitive method utilizing images as a medium to discover a relationship between abstract patterns and entities in industry products. In implementations, the present invention utilizes image generation and object detection and recognition technologies, and rule-based pre-analysis of industry products to improve performance and reduce the complexity of object detecting.

In many industries, there are different systems with complex processes and diverse relationships. The effort it takes for professionals in the industry to understand, design, redesign, validate or maintain a new system or project in the industry can be costly. Such efforts may be duplicated across the industry, which leads to developmental inefficiency. For example, in the field of business project auditing, different sizes of enterprises are engaged in projects of different scales. In general, a business process audit is a formal way to derive and assess whether a company is managing its business processes taking into account strategic objectives of the company, specific goals and appropriate procedures. When auditing at the stage of project acceptance, businesses are faced with very complex auditing standards and procedures. The auditing process of a large project may even last several months. A large number of documents and notes, the order in which documents are produced, and the order in which notes are produced, etc., all relate to the rigor and complexity of the audit process.

In another example, in Information Technology (IT) systems, evolving, reconstructing and/or constructing large legacy IT systems in a cloud environment can be a complex project. For example, in the process of refactoring (restructuring an existing body of code without changing its external behavior), a professional may wish to analyze whether the structure design of a legacy system is reasonable from the code level, in addition to analyzing and improving on the high-level integration architecture. However, large systems often have large code bases and complex hierarchies, making it difficult to understand the system's code structure intuitively.

In embodiments of the invention, professionals define complex systems or processes corresponding to entity elements and relationships based on a graph structure and image (e.g., using a class diagram). Embodiments of the invention provide a technical solution to the technical problem of understanding complex program code or process structures. Aspects of the invention essentially dismantle a complex process and identify combinations to generate templates to be visualized.

In the IT industry, there are generally 23 recognized design patterns that are proven, highly abstract, and re-used approaches to code design. The use of such design patterns makes the code easier to understand and more reliable. Embodiments of the invention provide an improvement in the field of program code refactoring by enabling the analyses of the code structure of a legacy system using design patterns to provide a deeper understanding of the business logic and code to facilitate refactoring and optimization. For example, when refactoring a system to microservices or migrating a system to a cloud environment, the present invention can help architects to better understand the legacy system (program code), and optimize the architecture design. Additionally, embodiments of the invention can lead to improved product quality. For example, implementations help professionals recognize design patterns in existing computer systems and determine whether the design patterns are reasonable and suitable for any new requirements.

Advantageously, embodiments of the invention provide a new method of automatic design pattern recognition that may be used in any industry having mature patterns in the industry, in order to facilitate an understanding of an industry product. Once a mature pattern is identified, methods of the present invention may be automatically implemented.

Implementations of the invention provide a way to transfer unstructured data to a structured image and discover patterns in an industry product that authors of the industry product may have inadvertently used (e.g., otherwise unrecognized highly abstract patterns).

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
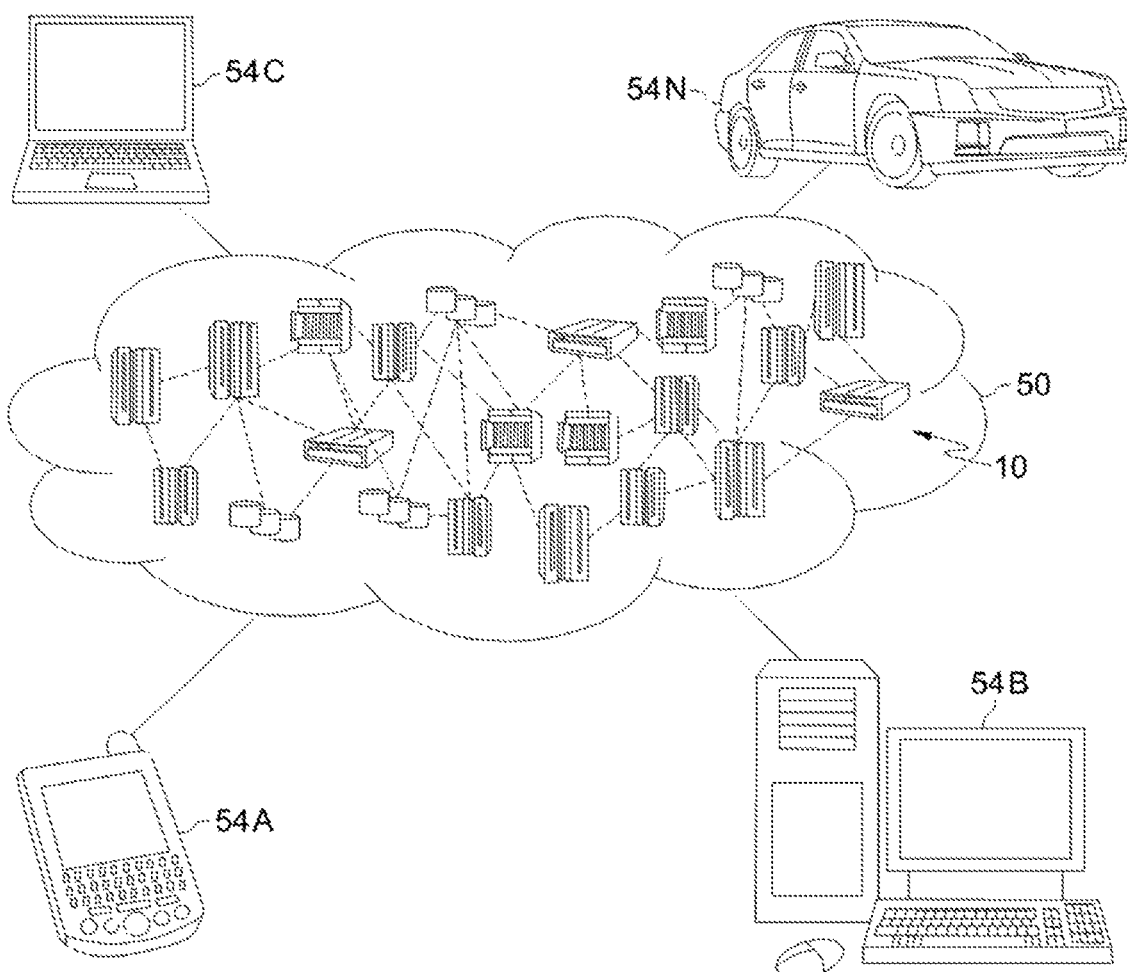
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
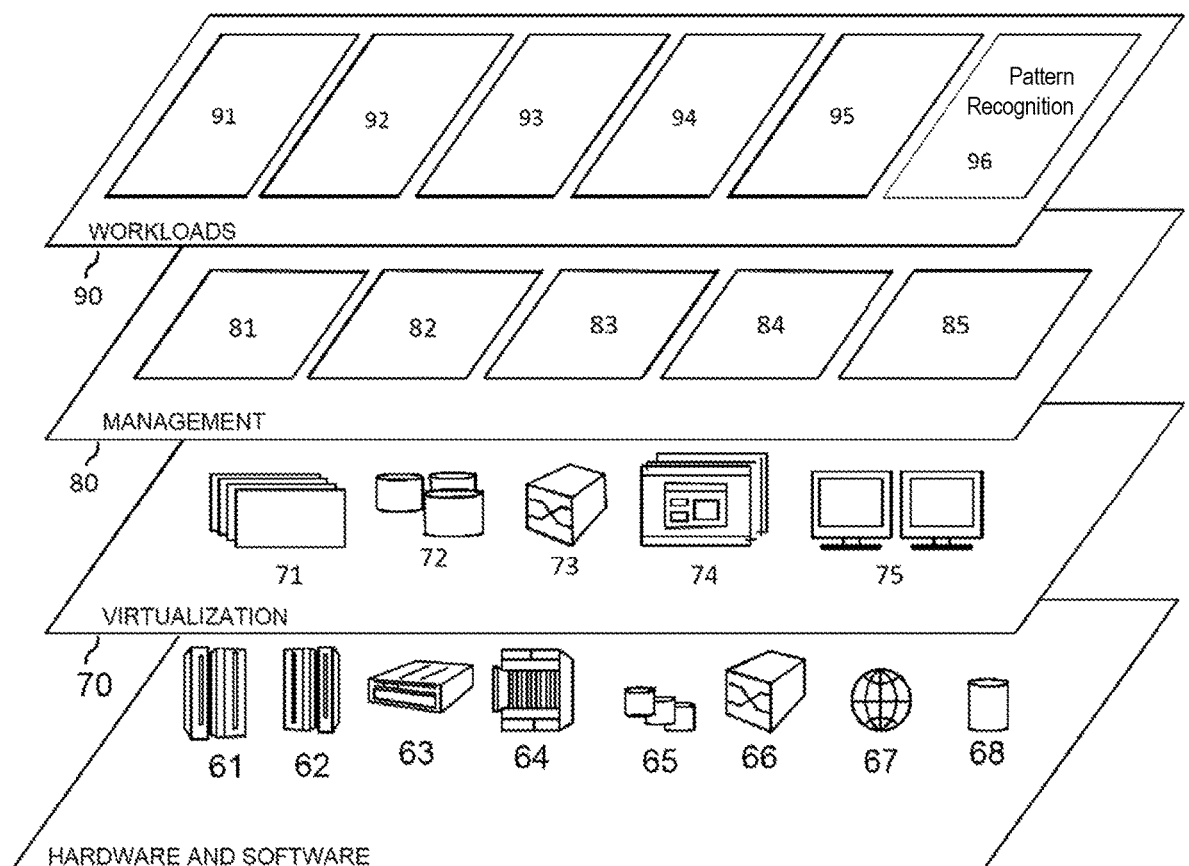
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pattern recognition 96.

Implementations of the invention may include a computer system/server 12 of FIG. 1 in which one or more of the program modules 42 are configured to perform (or cause the computer system/server 12 to perform) one of more functions of the pattern recognition 96 of FIG. 3. For example, the one or more of the program modules 42 may be configured to: analyze an digital industry product (e.g., program code or business process data) to identify elements and relationships between the elements based on stored rules, filter stored predetermined patterns to obtain a subset of patterns potentially relevant to the digital industry product, generate a diagram of graphical notations representing the elements and relationships between the elements, remove text from the diagram to produce a modified diagram, and determining that the modified diagram includes at least one predetermined pattern from a plurality of predetermined stored patterns or templates using image object detection.

Figure 4:
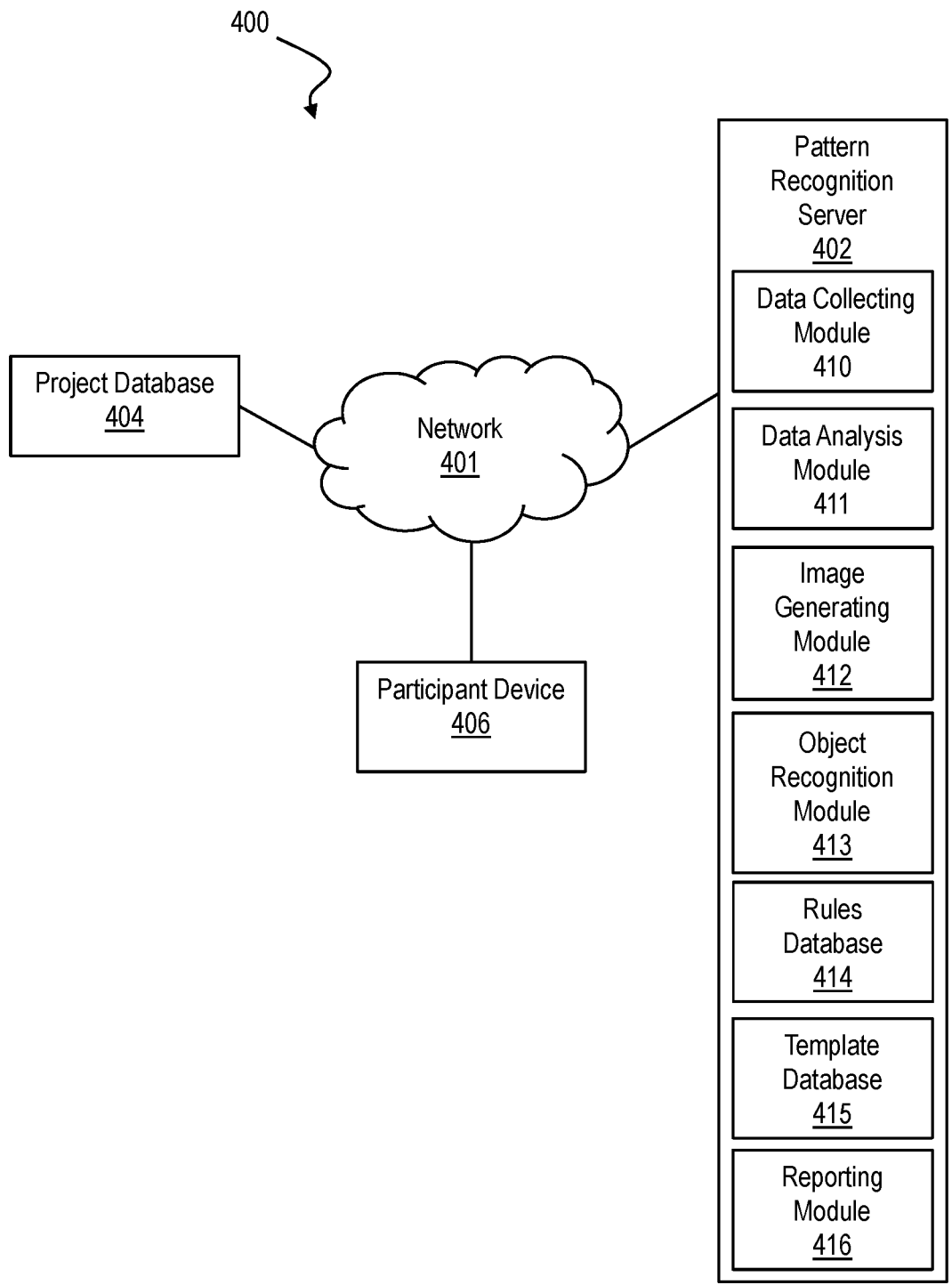
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 401 connecting a pattern recognition server 402 with one or more project databases represented at 404 and one or more participant devices represented at 406. In embodiments, the project database 404 includes components of the computer system 12 of FIG. 1, and is configured to store digital industry product data such as program code or business process data (e.g., text-based documents). The participant device 406 may also include components of the computer system 12 of FIG. 1, and may comprise a desktop computer, laptop computer, tablet, smartphone, or other personal computing device configured to communicate with the pattern recognition server 402.

The network 401 may be any suitable communication network or combination of networks, such as a local area network (LAN), a general wide area network (WAN), and/or a public network (e.g., the Internet). The pattern recognition server 402 may be in the form of the computer device 12 of FIG. 1 and may be a special computing device configured to provide pattern recognition services to participants associated with the one or more project databases 404 and/or one or more participant devices 406.

Still referring to FIG. 4, the pattern recognition server 402 may include one or more program modules (e.g., program module 42 of FIG. 1) executed by the pattern recognition server 402 and configured to perform one or more functions described herein. In embodiments, the pattern recognition server 402 includes one or more of the following: a data collecting module 410, a data analysis module 411, an image generating module 412, an object recognition module 413, a rules database 414, a template database 415 and a reporting module 416.

In implementations, the data collecting module 410 is configured to obtain digital industry product data for analysis by the pattern recognition server 402, such as from the project database 404 and/or participant device 406. Industry product data may be, for example, program code, or digital business documents (e.g., text-based documents).

In embodiments, the data analysis module 411 is configured to analyze industry product data obtained by the data collecting module 410 or stored in the pattern recognition server 402 for elements and relationships between elements. The elements and relationships may be determined based on rules stored in the rules database 414 defining predetermined elements and relationships for a particular industry. In aspects, the data analysis module 411 is configured to analyze program code to identify classes (code elements) and relationships between classes (e.g., association, dependency, realization, etc.) based on stored rules in the rules database 414. In implementations, the data analysis module 411 is configured to analyze business documents to identify business elements (e.g., signatures, contracts, etc.) and relationships between elements based on stored rules in the rules database 414. In embodiments, the data analysis module 411 is configured to filter stored patterns in the template database 415 to determine a subset of stored patterns potentially relevant to the industry product data by analyzes relationships between elements based on stored rules and based on keywords in the industry product data.

In embodiments, the image generating module 412 is configured to generate a diagram of graphical notations for identified elements and relationships based on stored image rules in the rules database 414. In embodiments, the diagram is a class diagram illustrating classes and class relationships in program code data. In implementations, the diagram is a business element diagram illustrating business elements and relationships between the elements in business process data.

In implementations, the object recognition module 413 is configured to remove text from the diagram produced by the image generating module 412 to produce a modified diagram, and determine at least one predetermined pattern in the modified diagram using image object detection based on stored patterns in the template database 415. In aspects, the predetermined patterns are program code patterns. In implementations, the predetermined patterns are business process patterns.

In aspects of the invention, the reporting module 416 is configured to generate reports including information regarding the at least one predetermined pattern determined by the object recognition module 413, and provide the reports to participants. In implementations, the reports identify inconsistencies between expected patterns and actual patterns present in the industry product data, based on stored rules in the rules database 414.

In embodiments, the pattern recognition server 402 may include additional or fewer components than those shown in FIG. 4. In embodiments, separate components may be integrated into a single computing component or module. Additionally, or alternatively, a single component may be implemented as multiple computing components or modules. Additionally, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Devices of the environment 400 may interconnect via wired connections, wireless connections, or a combination of wired and wireless connections.

Figure 5:
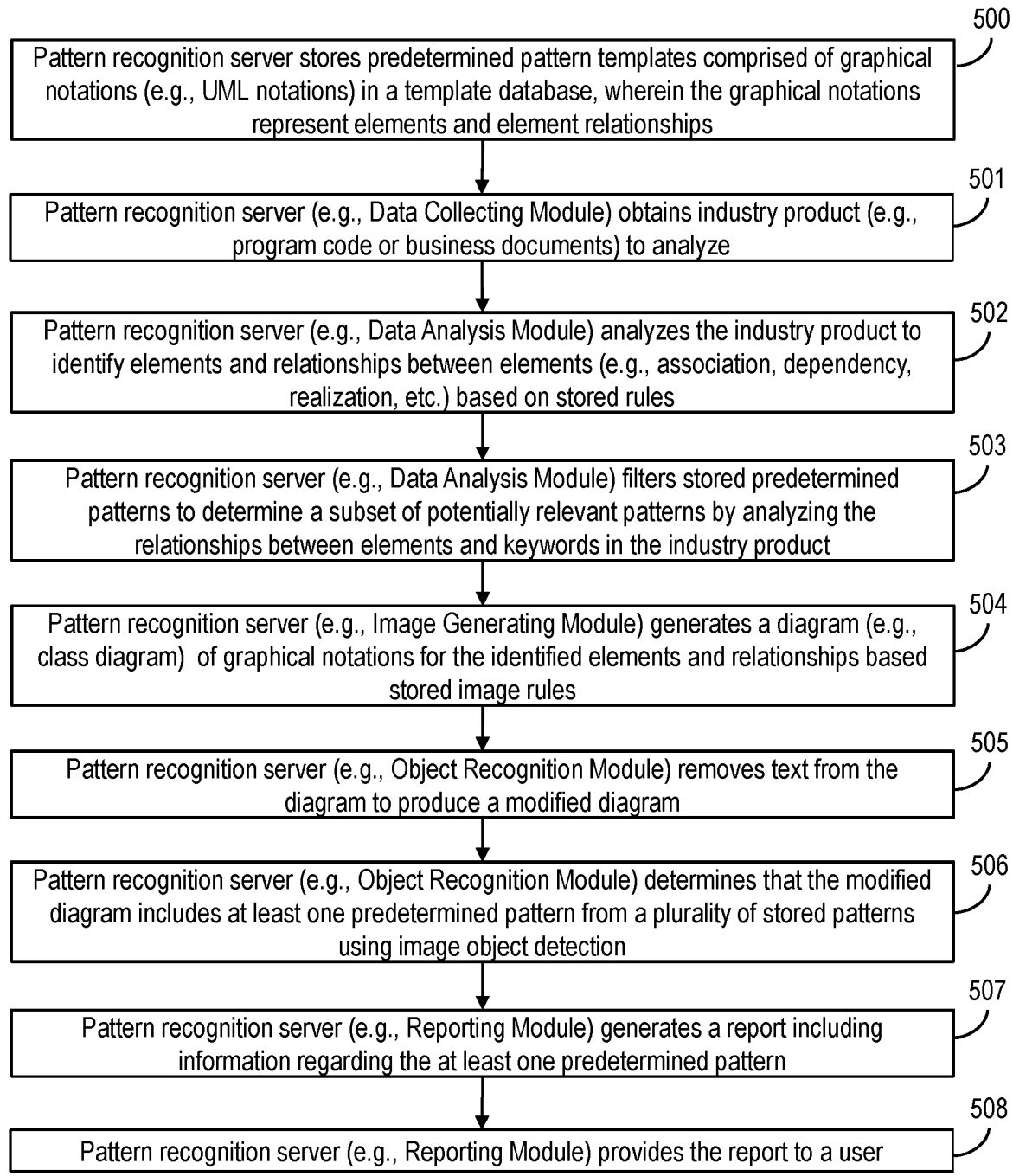
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the pattern recognition server 402 stores predetermined pattern templates comprised of graphical notations in the template database 415, wherein the graphical notations represent predetermined elements and relationships between elements for an industry. In implementations, the template database 415 may include a plurality of predetermined patterns for one or more industries. In aspects, for each predetermined pattern stored in the template database 415 there includes information such as: unique names identifying each pattern, a description of the goal behind the pattern and/or the reason for using it, alternative names for each pattern, a graphical representation of the pattern (e.g., class diagram or interaction diagram), a listing of elements (e.g., classes and/or objects) used in the pattern and their roles, a description of the interactions between elements, or other pertinent information regarding the patterns. In embodiments, the pattern recognition server 402 obtains the predetermine pattern templates from an outside party (e.g., participant device 406), or obtains the predetermined pattern templates from a user of the pattern recognition server 402. In implementations, the pattern templates are images representing predetermined software design patterns for a particular industry, such as creational, structural or behavioral patterns in the IT industry. In general, a software design pattern is a reusable solution to a commonly occurring problem within a given context in software design, and is in the form of a description or template for how to solve the problem that can be used in many different situations.

At step 501, the pattern recognition server 402 obtains a digital industry product (industry product data) to analyze. In implementations, the industry product is comprised of software code (e.g., code for a refactoring project) or business process data (e.g., text-based documents for a business auditing project). In implementations, the pattern recognition server 402 obtains the industry product from one or more project database 404 via the network 401. In embodiments, the data collecting module 410 of the pattern recognition server 402 implements step 501.

At step 502, the pattern recognition server 402 identifies elements and relationships between the elements in the industry product based on stored rules in the rules database 414. In implementations, the elements comprises program code classes or objects. In general, a class is a program-code template for creating objects. An object is an instance of a particular class or subclass. In other implementations, the elements comprise business process elements, such as a signature on a document. Elements and relationships between elements may be predefined for one or more industries in the rules database 414. Various tools and methods for determining elements and the relationships between the elements may be utilized by the pattern recognition server 402, including natural language processing and keyword recognition techniques. In embodiments, the data analysis module 411 of the pattern recognition server 402 implements step 502.

At step 503, the pattern recognition server 402 filters stored patterns in the template database 415 to determine a subset of stored patterns which are potentially relevant to the industry product obtained at step 501. In implementations, the pattern recognition server 402 analyzes the relationships between the elements identified at step 502 based on stored rules, and utilizes keywords in the industry product that match keywords in the stored rules to identify the subset of stored patterns. For example, the pattern recognition server 402 can utilize keywords in the industry product to determine a particular industry (e.g., IT industry or business auditing) associated with the industry product, and narrow down the potentially relevant patterns to those associated with the particular industry. In embodiments, the data analysis module 411 of the pattern recognition server 402 implements step 503.

At step 504, the pattern recognition server 402 generates a diagram of graphical and text-based notations for the identified elements and relationships based on stored image rules in the rules database 414. In implementations, the pattern recognition server 402 generates a class diagram depicting a system's classes, their attributes, operations and the relationships among objects. In aspects, the class diagram utilizes the Unified Modeling Language (UML). In other implementations, the pattern recognition server 402 generates a business process diagram depicting the elements and relationships between the elements. Diagram generating tools, such as class diagram generating tools and methods may be utilized to generate an initial diagram. In embodiments, the initial diagram generated by the pattern recognition server 402 is transformed by re-orienting elements of the diagram to produce a formatted diagram. In aspects, the elements of the diagram are arranged on a horizontal and vertical orientation. In implementations, subclasses of one element or class are arranged in a vertical orientation below the element or class. In aspects, the formatted diagram is different from the initial diagram, and is in a better form for image processing according to step 506. In aspects, the text-based notations describe the elements and/or relationships. In implementations, the text-based notations include an element identifier, an attribute of the element, methods of the element, and/or various other parameters associated with the element. In embodiments, the image generating module 412 of the pattern recognition server 402 implements step 504.

At step 505, the pattern recognition server 402 removes text from the diagram to produce a modified diagram. In implementations, text and/or image recognition tools are utilized by the pattern recognition server 402 to detect text (e.g., class names, etc.) within the diagram, and the pattern recognition server 402 thereafter removes the identified text to create the modified diagram. It can be understood that removing text from the diagram facilitates accurate recognition of image objects according to step 506. In embodiments, the object recognition module 413 of the pattern recognition server 402 implements step 505.

At step 506, the pattern recognition server 402 determines that the modified diagram includes at least one predetermined pattern from a plurality of predetermined patterns (templates) stored in the template database 415, using image object detection. Various object recognition tools and methods may be utilized by the pattern recognition server 402 in the implementation of step 506. For example, edge matching techniques may be utilized to detect objects in a diagram. In general, edge matching detects edges in templates and an image, and compares edges images to find a matching template. In implementations, the pattern recognition server 402 determines at least one predetermined pattern from a subset of predetermined patterns (determined at step 503) is present in the modified diagram. In embodiments, the image object detection of step 506 determines that a predetermined pattern comprised of a combination of UML graphical notations is present within the modified diagram. In embodiments, the object recognition module 413 of the pattern recognition server 402 implements step 506.

At step 507, the pattern recognition server 402 generates a report including information regarding the at least one predetermined pattern in the industry product. In implementations, the report includes information regarding a type of pattern associated with the predetermined pattern, such as Behavioral, Creational, or Structural. In embodiments, the report includes at least one of: an image of the at least one predetermined pattern; a description of the type of pattern; and an image of the predetermined pattern with associated text (i.e., associated text removed at step 505), such as class name and associated methods. In implementations, the pattern recognition server 402 compares the at least one predetermined pattern in the modified diagram with patterns expected to be found in the industry product to determine any discrepancies between actual patterns present and expected patterns, based on stored rules. In such cases, the report may include information regarding discrepancies regarding the actual patterns present in the industry product versus the patterns expected to be present in the industry product. In embodiments, the reporting module 416 of the pattern recognition server 402 implements step 507.

At step 508, the pattern recognition server 402 provides the report to a user. In embodiments, the pattern recognition server 402 sends the report to a remote participant device 406 via the network 401. In implementations, the pattern recognition server 402 provides the report to a user of the pattern recognition server 402, such as through a display (e.g., display 24 of FIG. 1). In embodiments, the reporting module 416 of the pattern recognition server 402 implements step 508.

Figure 6:
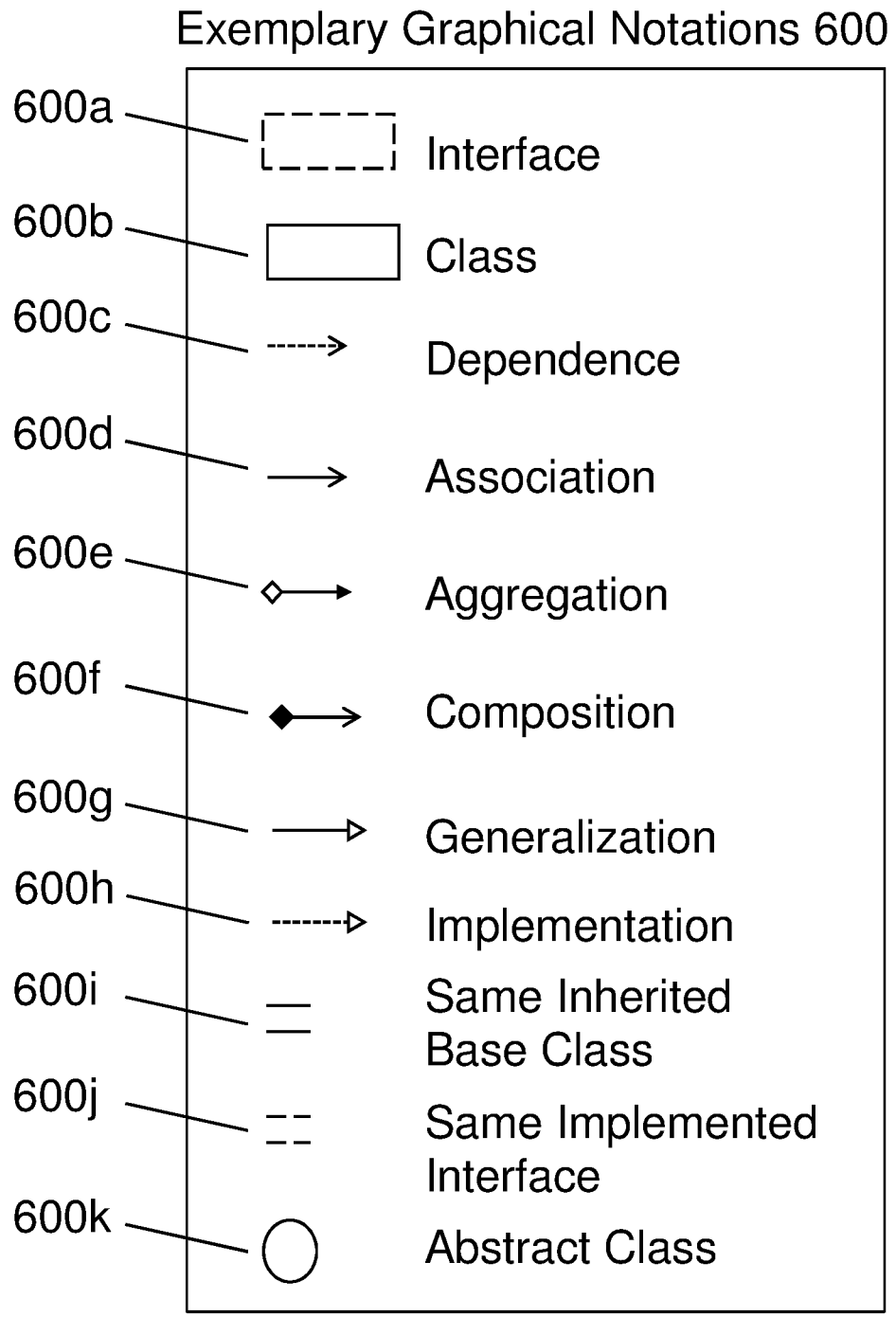
FIG. 6 depicts exemplary graphical notations in accordance with aspects of the invention.

FIG. 6 depicts exemplary graphical notations in accordance with aspects of the invention. In implementations, graphical notations such as the exemplary graphical notations 600a-600k of FIG. 6 may be utilized by the pattern recognition server 402 in the generation of diagrams in accordance with step 504 of FIG. 5. In the example shown, graphical notations include: a notation for an interface 600a, a notation for class 600b, a notation for dependence 600c, a notation for association 600d, a notation for aggregation 600e, a notation for composition 600f, a notation for generalization 600g, a notation for implementation 600h, a notation for same inherited base class 600i, a notation for same implemented interface 600j, and a notation for abstract class 600k.

Figure 7:
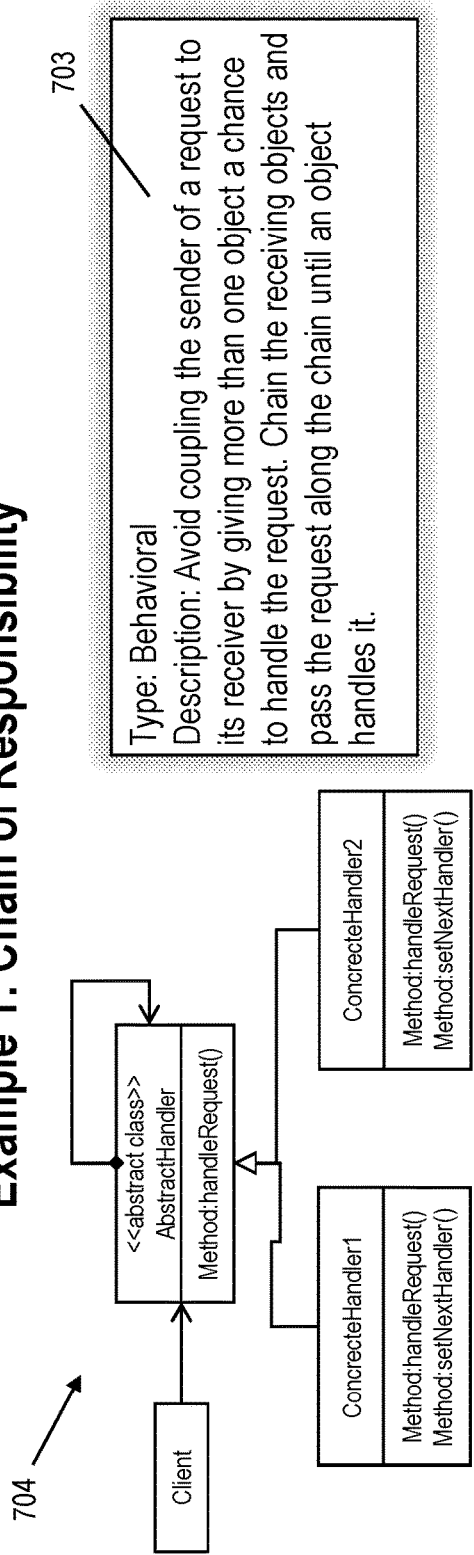
FIG. 7 depicts an exemplary class diagram report for a predetermined Chain of Responsibility pattern.
Figure 7:
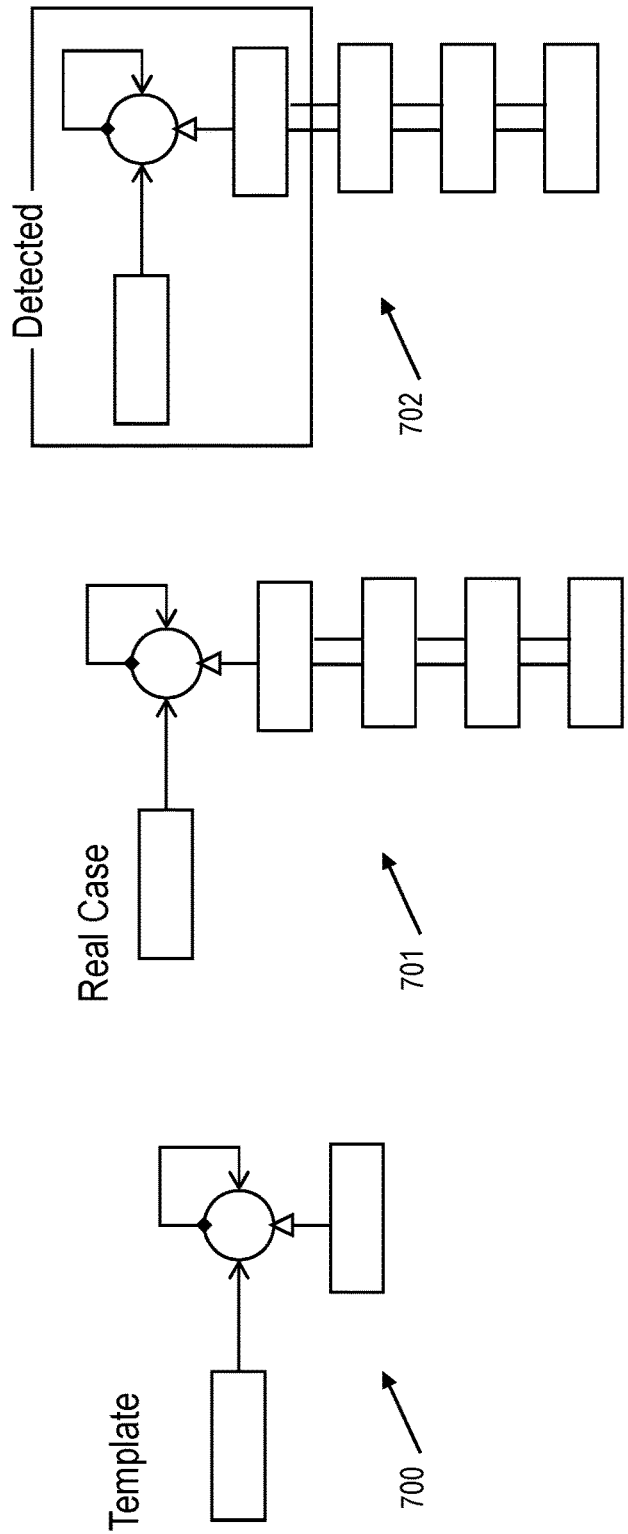

FIG. 7 depicts an exemplary class diagram report for a predetermined Chain of Responsibility pattern. More specifically, FIG. 7 depicts the predetermined "Chain of Responsibility" pattern or template 700, which is comprised of a plurality of graphical notations having distinct meanings according to stored rules in the rules database 414. FIG. 7 further depicts an actual pattern or real case pattern 701 present in a modified diagram (generated according to step 505 of FIG. 5). An image 702 depicts the detection of the predetermined pattern or template 700 in the real case pattern 701 (as determined at step 506 of FIG. 5). The example of FIG. 7 further includes additional information regarding a type of the predetermined "Chain of Responsibility" pattern or template 700, including a description 703 of the predetermined pattern. In this case, the predetermined pattern or template 700 is of the type "Behavioral", and a description of the "Chain of Responsibility" pattern is provided below the type. Additionally, the exemplary report of FIG. 7 includes details 704 regarding the program code (industry product) analyzed by the pattern recognition server 402. In particular, FIG. 7 depicts an image from a non-modified diagram including text-based details regarding classes of the program code and relationships between those classes. For example, FIG. 7 depicts a class name "ConcrecteHandler1" with methods for the class listed as "Method:handleRequest( )" and "Method:setNextHandler( )." When forming a diagram including the real case pattern 701, an initial image of a pattern represented at 704 may be transformed by changing the position of elements (e.g., to arrange elements horizontally). In this way, the upper image 704 is transformed into the lower real case pattern image represented at 701.

Figure 8:
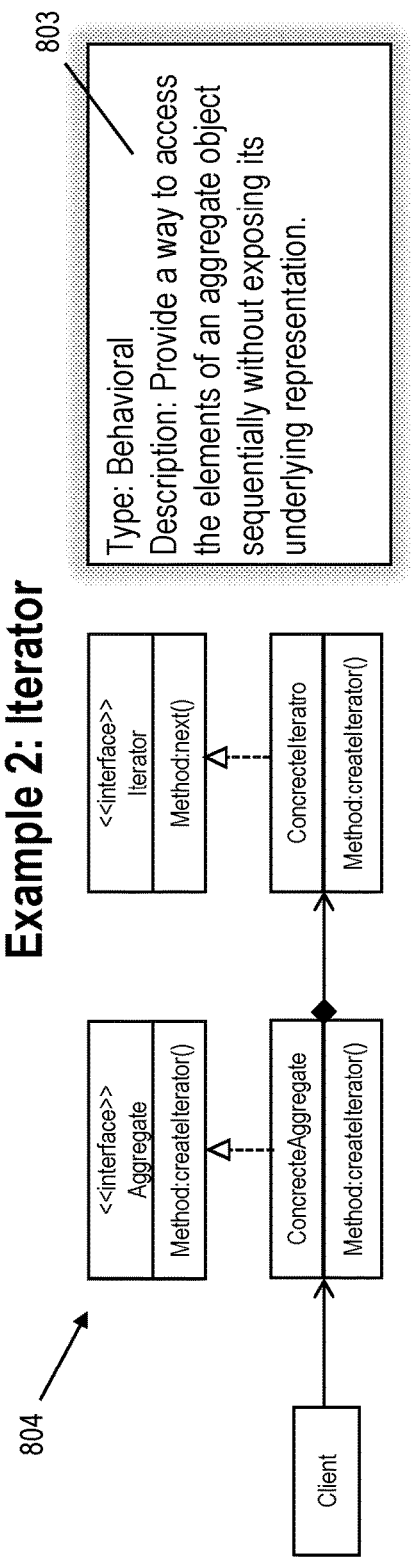
FIG. 8 depicts an exemplary class diagram report for an Itorator pattern.
Figure 8:
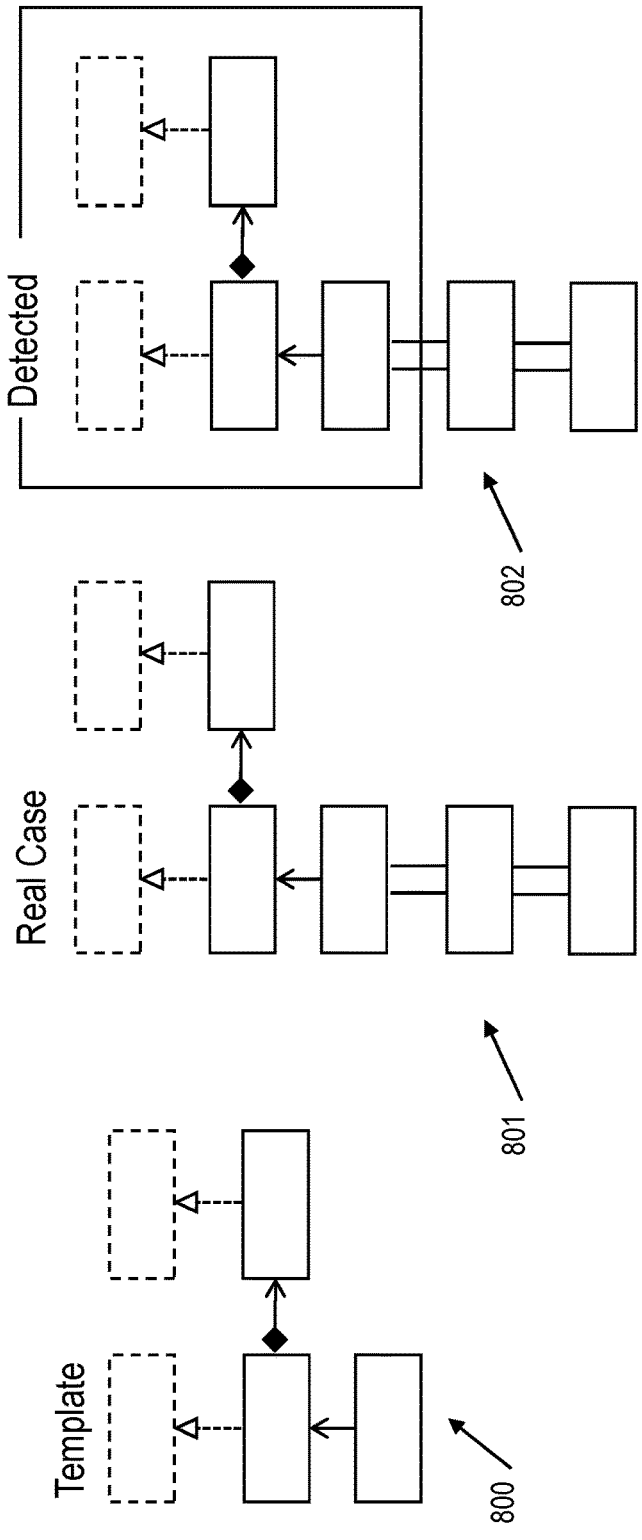

FIG. 8 depicts an exemplary class diagram report for an Itorator pattern. More specifically, FIG. 8 depicts the predetermined "Itorator" pattern or template 800, which is comprised of a plurality of graphical notations having distinct meanings according to stored rules in the rules database 414. FIG. 8 further depicts an actual pattern or real case pattern 801 present in a modified diagram (generated according to step 505 of FIG. 5). An image 802 depicts the detection of the predetermined pattern or template 800 in the real case pattern 801 (as determined at step 506 of FIG. 5). The example of FIG. 8 further includes additional information regarding a type of the predetermined "Itorator" pattern or template 800, including a description 803 of the type of the predetermined pattern. In this case, the predetermined pattern or template 800 is of the type "Behavioral", and a description of the "Itorator" pattern is provided below the type. Additionally, the exemplary report of FIG. 8 includes details 804 regarding the program code (industry product) analyzed by the pattern recognition server 402. In particular, FIG. 8 depicts an image from a non-modified diagram including text-based details regarding classes of the program code and relationships between those classes. For example, FIG. 8 depicts a class name "ConcrecteAggregate" with a method for the class listed as "Method:createIterator( )."

Figure 9:
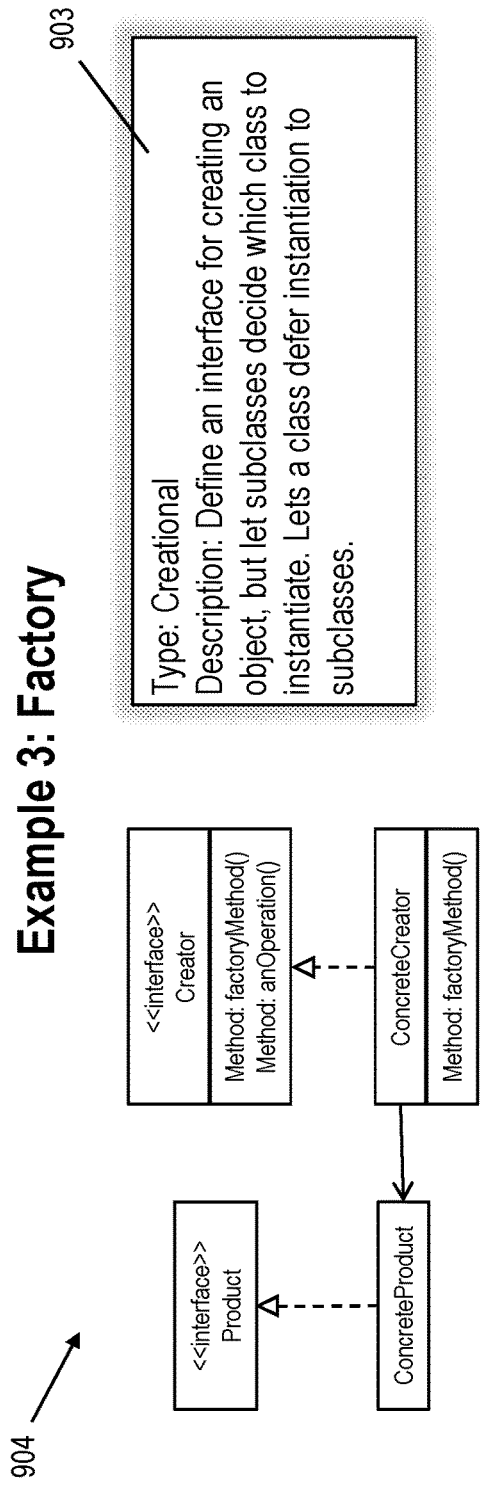
FIG. 9 depicts an exemplary class diagram report for a Factory pattern.
Figure 9:
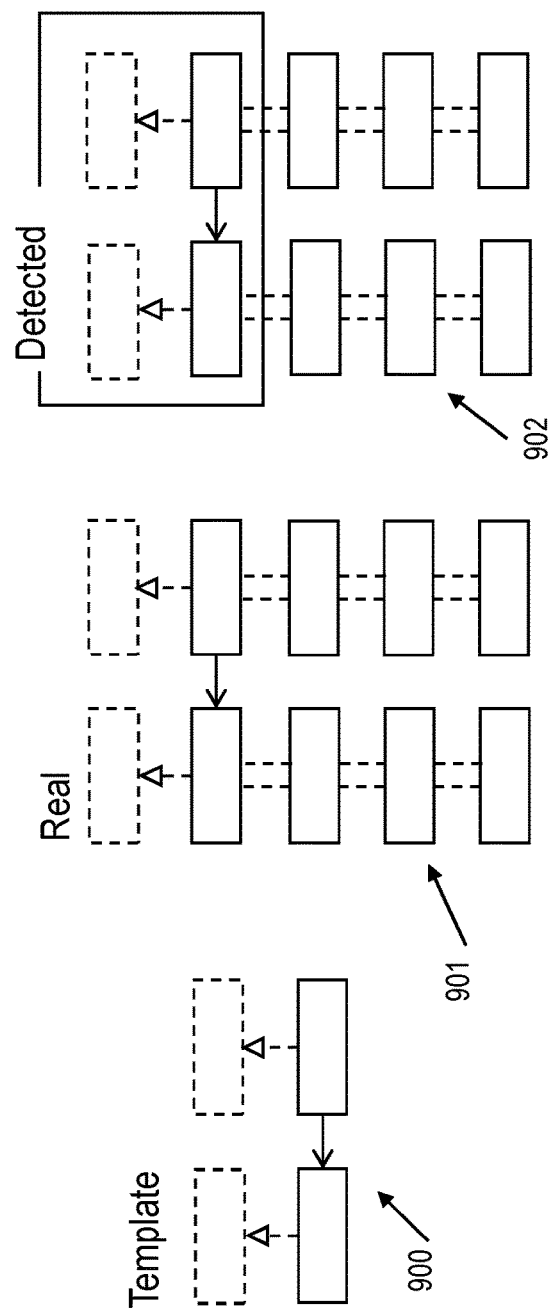

FIG. 9 depicts an exemplary class diagram report for a Factory pattern. More specifically, FIG. 9 depicts the predetermined "Factory" pattern or template 900, which is comprised of a plurality of graphical notations having distinct meanings according to stored rules in the rules database 414. FIG. 9 further depicts an actual pattern or real case pattern 901 present in a modified diagram (generated according to step 505 of FIG. 5). An image 902 depicts the detection of the predetermined pattern or template 900 in the real case pattern 901 (as determined at step 506 of FIG. 5). The example of FIG. 9 further includes additional information regarding a type of the predetermined "Factory" pattern or template 900, including a description 903 of the type of the predetermined pattern. In this case, the predetermined pattern or template 900 is of the type "Creational", and a description of the "Factory" pattern is provided below the type. Additionally, the exemplary report of FIG. 9 includes details 904 regarding the program code (industry product) analyzed by the pattern recognition server 402. In particular, FIG. 9 depicts an image from a non-modified diagram including text-based details regarding classes of the program code and relationships between those classes. For example, FIG. 9 depicts a class name "ConcreteCreator" with a method for the class listed as "Method: factoryMethod( )."

Figure 10:
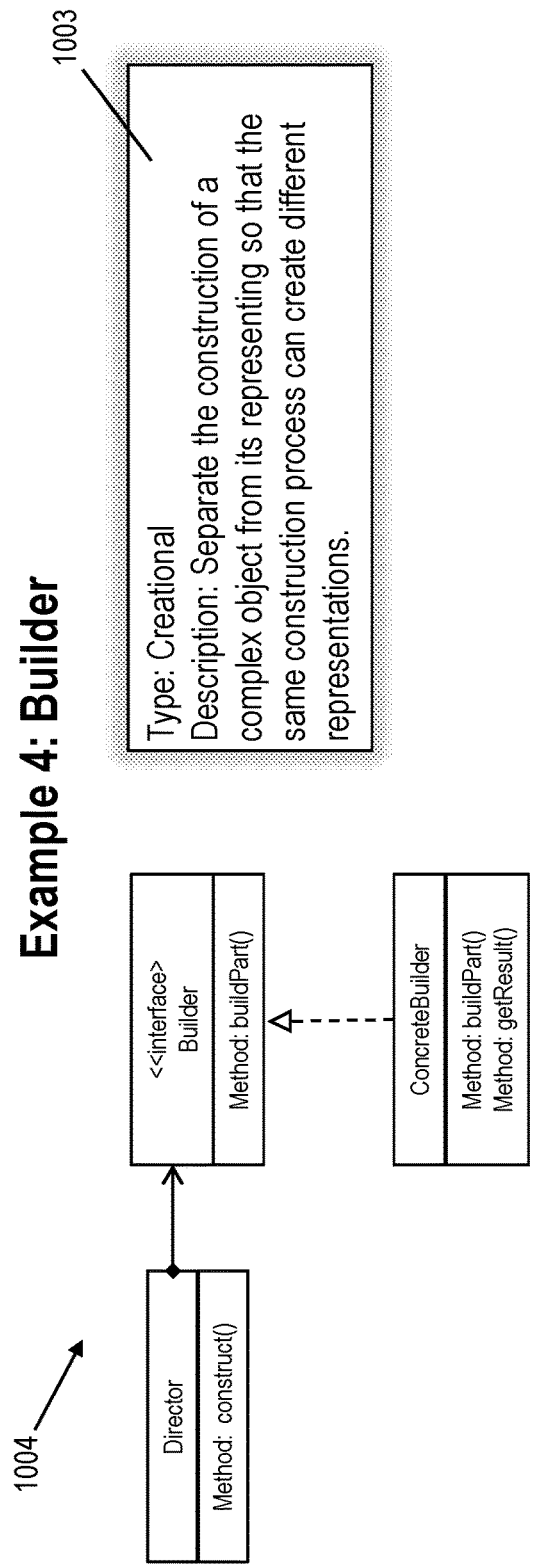
FIG. 10 depicts an exemplary class diagram report for a Builder pattern.
Figure 10:
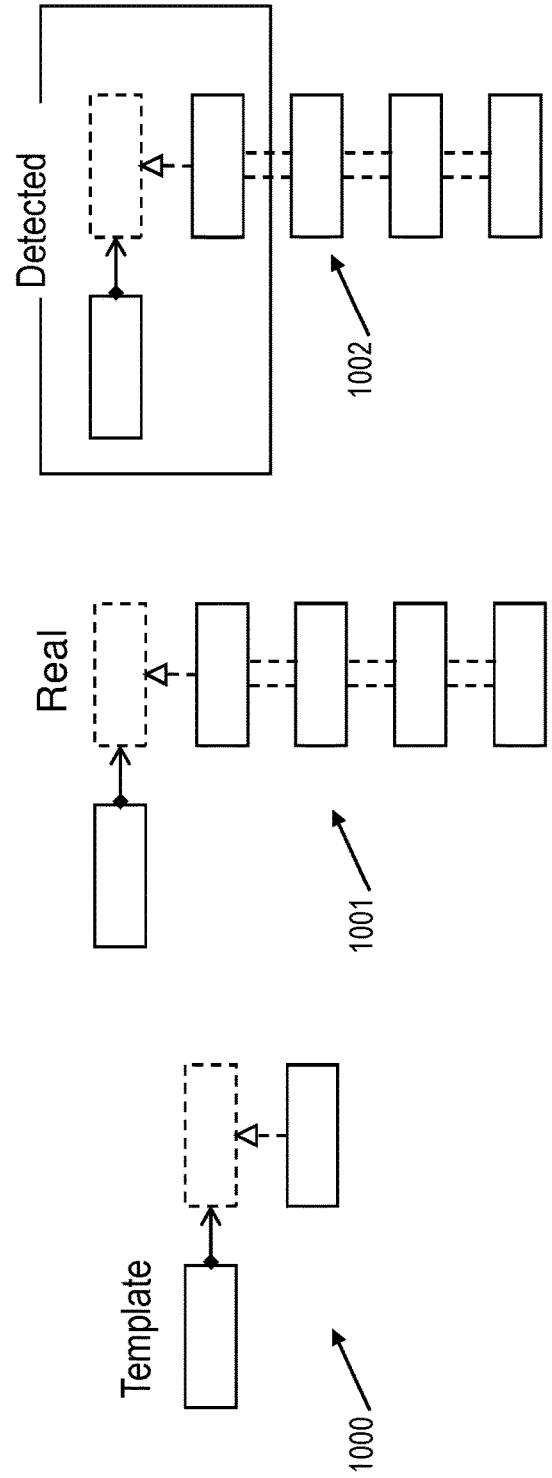

FIG. 10 depicts an exemplary class diagram report for a Builder pattern. More specifically, FIG. 10 depicts the predetermined "Builder" pattern or template 1000, which is comprised of a plurality of graphical notations having distinct meanings according to stored rules in the rules database 414. FIG. 10 further depicts an actual pattern or real case pattern 1001 present in a modified diagram (generated according to step 505 of FIG. 5). An image 1002 depicts the detection of the predetermined pattern or template 1000 in the real case pattern 1001 (as determined at step 506 of FIG. 5). The example of FIG. 10 further includes additional information regarding a type of the predetermined "Builder" pattern or template 1000, including a description 1003 of the type of the predetermined pattern. In this case, the predetermined pattern or template 1000 is of the type "Creational", and a description of the "Builder" pattern is provided below the type. Additionally, the exemplary report of FIG. 10 includes details 1004 regarding the program code (industry product) analyzed by the pattern recognition server 402. In particular, FIG. 10 depicts an image from a non-modified diagram including text-based details regarding classes of the program code and relationships between those classes. For example, FIG. 10 depicts a class name "ConcreteBuilder" with methods for the class listed as "Method: buildPart( )" and "Method: getResult( )."

Figure 11:
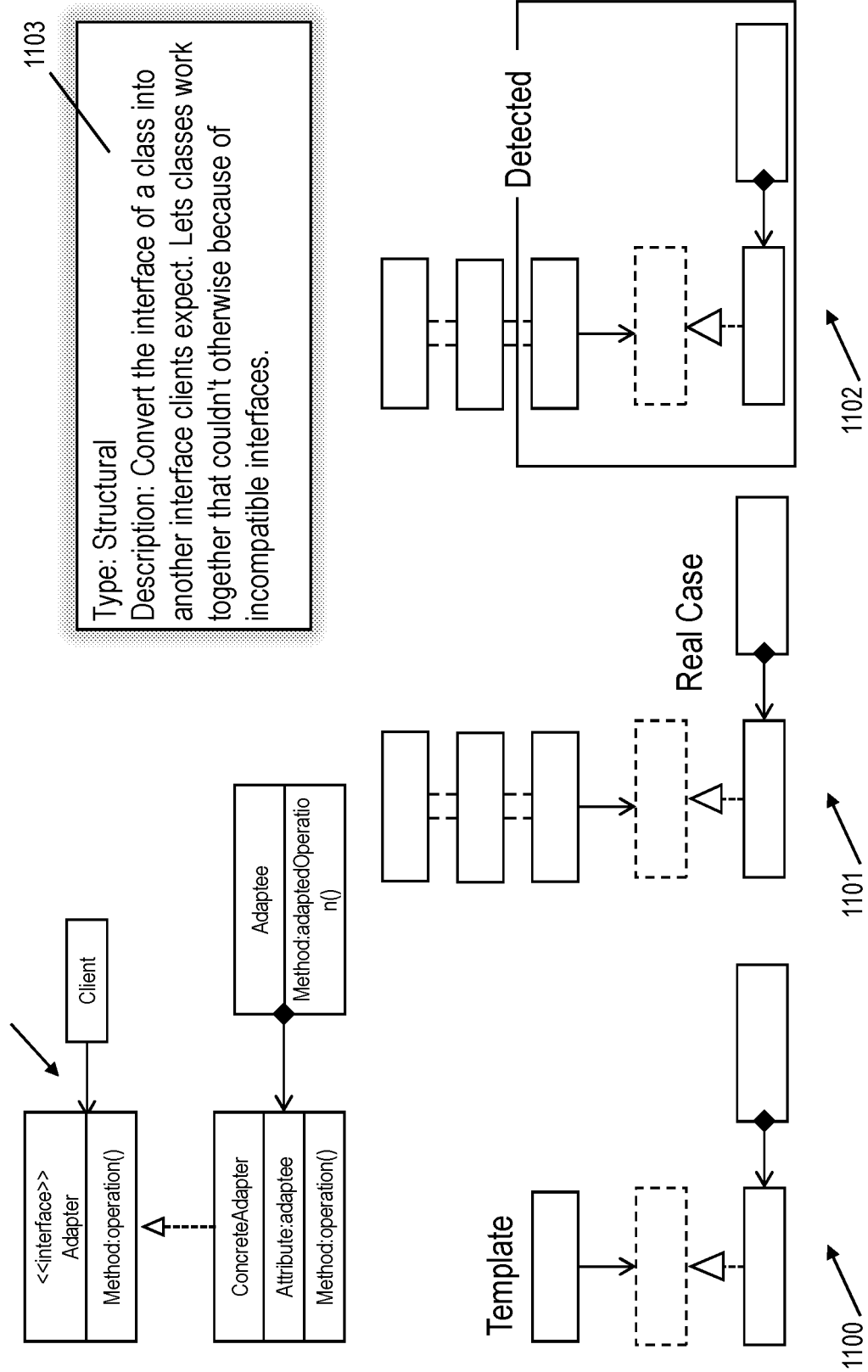
FIG. 11 depicts an exemplary class diagram report for an Adapter pattern.

FIG. 11 depicts an exemplary class diagram report for an Adapter pattern. More specifically, FIG. 11 depicts the predetermined "Adapter" pattern or template 1100, which is comprised of a plurality of graphical notations having distinct meanings according to stored rules in the rules database 414. FIG. 11 further depicts an actual pattern or real case pattern 1101 present in a modified diagram (generated according to step 505 of FIG. 5). An image 1102 depicts the detection of the predetermined pattern or template 1100 in the real case pattern 1101 (as determined at step 506 of FIG. 5). The example of FIG. 11 further includes additional information regarding a type of the predetermined "Adapter" pattern or template 1100, including a description 1103 of the type of the predetermined pattern. In this case, the predetermined pattern or template 1100 is of the type "Structural", and a description of the "Adapter" pattern is provided below the type. Additionally, the exemplary report of FIG. 11 includes details 1104 regarding the program code (industry product) analyzed by the pattern recognition server 402. In particular, FIG. 11 depicts an image from a non-modified diagram including text-based details regarding classes of the program code and relationships between those classes. For example, FIG. 11 depicts a class name "ConcreteAdapter" with an attribute "Attribute:adaptee: and a method for the class listed as "Method:operation( )."

Figure 12:
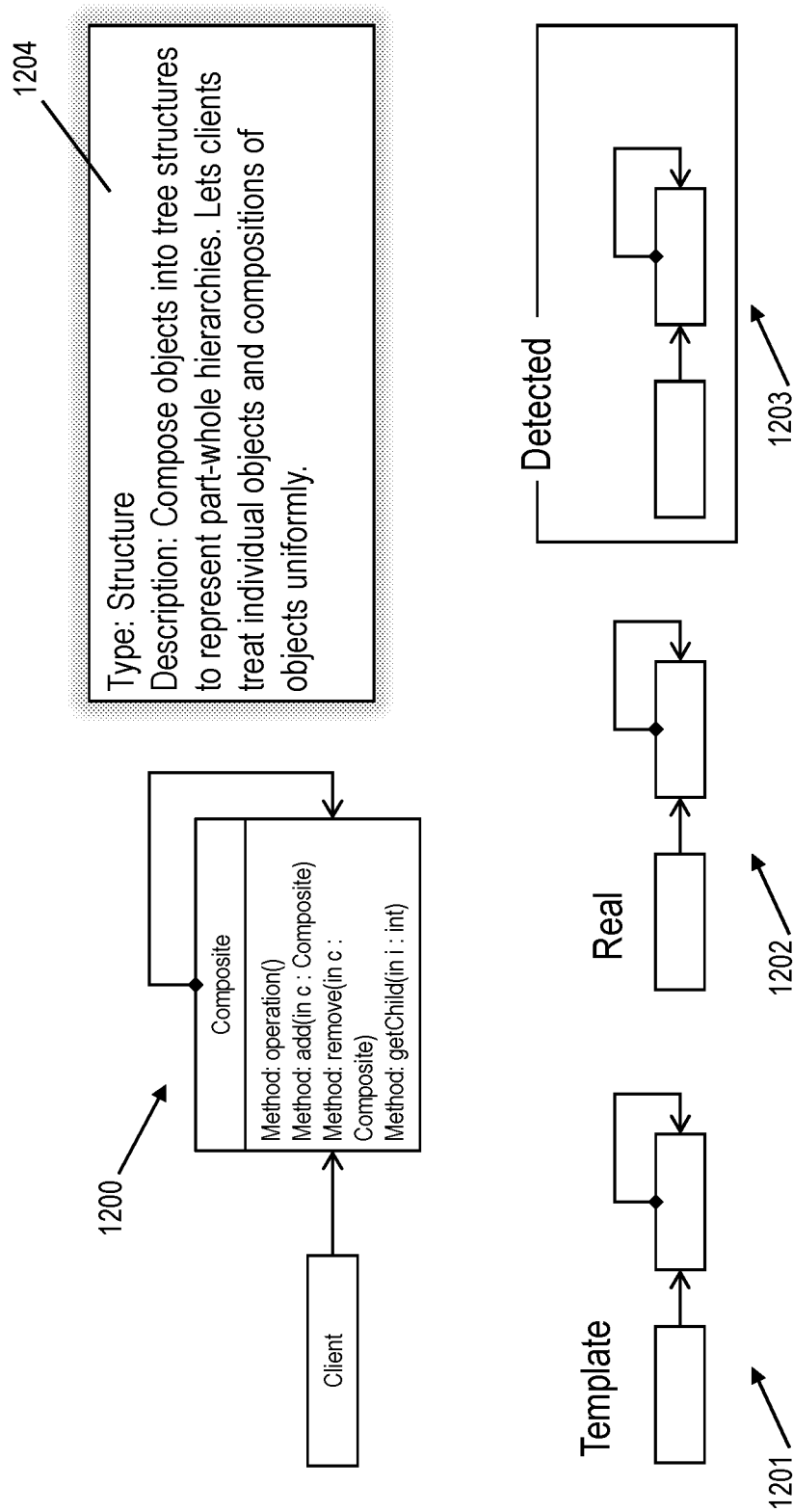
FIG. 12 depicts an exemplary class diagram report for a Composite pattern.

FIG. 12 depicts an exemplary class diagram report for a Composite pattern. More specifically, FIG. 12 depicts the predetermined "Composite" pattern or template 1200, which is comprised of a plurality of graphical notations having distinct meanings according to stored rules in the rules database 414. FIG. 12 further depicts an actual pattern or real case pattern 1201 present in a modified diagram (generated according to step 505 of FIG. 5). An image 1202 depicts the detection of the predetermined pattern or template 1200 in the real case pattern 1201 (as determined at step 506 of FIG. 5). The example of FIG. 12 further includes additional information regarding a type of the predetermined "Composite" pattern or template 1200, including a description 1203 of the type of the predetermined pattern. In this case, the predetermined pattern or template 1200 is of the type "Structure", and a description of the "Composite" pattern is provided below the type. Additionally, the exemplary report of FIG. 12 includes details 1204 regarding the program code (industry product) analyzed by the pattern recognition server 402. In particular, FIG. 12 depicts an image from a non-modified diagram including text-based details regarding classes of the program code and relationships between those classes. For example, FIG. 12 depicts a class name "Composite" with methods for the class listed as "Method: operation( )", "Method: add(in c: Composite)", "Method: remove(in c: Composite)", and "Method: getChild (in i: int)."

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, by a computing device, predefined unstructured data elements and relationships between the unstructured data elements in a digital data product based on stored rules;
    generating, by the computing device, a diagram image based on stored image rules, the diagram image including graphical notations and text-based information representing the unstructured data elements and the relationships between the unstructured data elements;
    identifying, by the computing device, the text-based information in the diagram image utilizing an image recognition tool;
    removing, by the computing device, the text-based information from the diagram image to produce a modified diagram image to facilitate accurate computer-implemented image object detection;
    accessing, by the computing device, a store of template images of patterns;
    analyzing, by the computing device, the modified diagram image using the computer-implemented image object detection to determine that the modified diagram image includes at least one image of a pattern from the template images of patterns based on matching an image of a pattern of graphical notations in the modified diagram image with at least one image of a pattern of graphical notations in the template images of patterns; and
    generating, by the computing device, a report including characteristics of the at least one image of a pattern;
    wherein the digital data product comprises program code, the store of template images comprises software design patterns, and the analyzing the modified diagram image using the computer-implemented image object detection utilizes edge matching techniques to detect edges in the modified diagram image and match the edges of the modified diagram image with edges of the at least one image of a pattern from the software design patterns.

2. The computer-implemented method of claim 1, wherein the report includes the at least one image of a pattern and the text-based information.

3. The computer-implemented method of claim 1, further comprising determining, by the computing device, one or more discrepancies exist between the image of a pattern and expected patterns based on stored rules, wherein the report includes information regarding the one or more discrepancies.

4. The computer-implemented method of claim 2, further comprising sending, by the computing device, the report to a user.

5. The computer-implemented method of claim 1, further comprising filtering, by the computing device, the store of template images of patterns to generate a subset of the store of template images of patterns based on the unstructured data elements, the relationship between the unstructured data elements, and keywords in the digital data product, wherein the determining the at least one image of a pattern comprises determining the at least one image of a pattern from the subset of the store of template images of patterns.

6. The computer-implemented method of claim 1, wherein the graphical notations comprise Unified Modeling Language (UML) notations, the digital image comprises structured image data, and the generating the diagram image transfers the unstructured data elements to the structured image data for the purpose of identifying abstract patterns in the unstructured data elements.

7. The computer-implemented method of claim 1, wherein a service provider at least one of creates, maintains, deploys and supports the computing device.

8. The computer-implemented method of claim 1, wherein the removing the text-based information from the diagram image to produce a modified diagram image and the analyzing the modified diagram image are provided by a service provider on a subscription, advertising, and/or fee basis.

9. The computer-implemented method of claim 1, wherein the computing device includes software provided as a service in a cloud environment.

10. A computer program product, the computer program product comprising one or more computer readable storage media having program instructions collectively stored on the one or more computer readable storage media, the program instructions executable to:
    identify classes and relationships between classes in a software program code based on stored rules;
    generate a diagram image based on stored image rules and the classes and relationships between classes in the software program code, the diagram image including graphical notations and text-based information regarding the software program code;

remove the text-based information from the diagram image to produce a modified diagram image to facilitate accurate computer-implemented image object detection;

accessing, by the computing device, a store of template images of patterns;

analyzing the modified diagram image using the computer-implemented image object detection to determine that the modified diagram image includes at least one predetermined pattern from the store of template images of patterns based on matching an image of a pattern of graphical notations in the modified diagram image with at least one image of a pattern of graphical notations in the at least one predetermined pattern; and generate a report including information regarding the at least one predetermined pattern;

wherein the store of template images of patterns comprises software design patterns, and the analyzing the modified diagram image using the computer-implemented image object detection utilizes edge matching techniques to detect edges in the modified diagram image and match the edges of the modified diagram image with edges of the at least one predetermined pattern from the software design patterns.

11. The computer program product of claim 10, wherein the program instructions are further executable to determine one or more discrepancies exist between the at least one predetermined pattern and expected patterns based on stored rules, wherein the report includes information regarding the one or more discrepancies.

12. The computer program product of claim 10, wherein the program instructions further cause the computing device to send the report to a remote computing device.

13. The computer program product of claim 10, wherein the program instructions further cause the computing device to filter the store of template images of patterns to generate a subset of the store of template images of patterns based on the classes, the relationships between the classes, and keywords in the program code, wherein the determining the at least one predetermined pattern comprises determining the at least one predetermined pattern from the subset of the store of template images of patterns.

14. The computer program product of claim 10, wherein the graphical notations comprise Unified Modeling Language (UML) notations.

15. A system comprising:
a processor, a computer readable memory, and a computer readable storage medium;

program instructions to identify elements and relationships between elements in a digital data product based on stored rules;

program instructions to generate a diagram image based on stored image rules and the identified elements and relationships between elements in the digital data product, the diagram image including graphical notations and text-based information representing the elements and the relationships between the elements;

program instructions to remove the text-based information from the diagram image to produce a modified diagram image to facilitate accurate computer-implemented image object detection;

program instructions to analyze the modified diagram image using the computer-implemented image object detection to determine, by comparing objects in the modified diagram image to objects in a plurality of stored patterns, that the modified diagram image includes at least one predetermined pattern from the plurality of stored patterns; and program instructions to generate a report including information regarding the at least one predetermined pattern, wherein the program instructions are stored on the computer readable storage medium for execution by the processor via the computer readable memory; and wherein the digital data product comprises program code, the plurality of stored patterns comprises software design patterns, and the analyzing the modified diagram image using computer-implemented image object detection utilizes edge matching techniques to detect edges in the modified diagram image and match the edges of the modified diagram image with edges of the at least one predetermined pattern from the plurality of stored patterns.

16. The system of claim 15, wherein the modified diagram image comprising an image without any text, and the report includes characteristics of the predetermined pattern.

17. The system of claim 15, further comprising program instructions to send the report to a remote participant device.

18. The system of claim 15, further comprising program instructions to generate a subset of the stored patterns based on the elements, the relationships between the elements, and keywords in the digital industry product, wherein the determining the at least one predetermined pattern comprises determining the at least one predetermined pattern from the subset of the stored patterns.

19. The system of claim 15, wherein the graphical notations comprise Unified Modeling Language (UML) notations.

* * * * *